United States Patent [19]

Dugan

[11] Patent Number: 5,071,663

[45] Date of Patent: Dec. 10, 1991

[54] CHEESE GRATER AND PACKAGE

[76] Inventor: Ed Dugan, Rte. 2, Box 236D, St. Joe, Ark. 72675

[21] Appl. No.: 616,256

[22] Filed: Nov. 20, 1990

[51] Int. Cl.⁵ .................... B02C 19/12; B65D 83/06; B65D 85/76

[52] U.S. Cl. .................................. 426/112; 426/115; 426/124; 426/130; 241/95; 241/168

[58] Field of Search ............... 426/115, 112, 130, 124; 241/95, 168, 169.1, 273.2; 222/80; 215/228

[56] References Cited

U.S. PATENT DOCUMENTS

| | | | |
|---|---|---|---|
| 100,280 | 3/1870 | Gerhard | 241/95 |
| 284,487 | 9/1883 | Rogers | 241/95 |
| 435,235 | 8/1890 | Maxson | 241/169.1 |
| 528,416 | 10/1894 | Davidson | 241/273.2 |
| 926,327 | 6/1909 | Hoffman | 241/273.2 |
| 936,101 | 10/1909 | Edwards | 241/169.1 |
| 1,182,541 | 5/1916 | Egge | 241/273.2 |
| 1,199,874 | 10/1916 | Butera | 241/273.2 |
| 1,519,532 | 12/1924 | Eulis | 241/273.2 |
| 1,661,076 | 2/1928 | Maestro | 241/273.2 |
| 2,270,935 | 1/1942 | Doering | 426/115 |
| 2,867,255 | 1/1959 | Berney et al. | 241/273.2 |
| 3,459,296 | 8/1969 | Berg | 426/115 |
| 3,464,469 | 9/1969 | Belz | 241/169.1 |
| 3,552,460 | 1/1971 | Cooney | 241/169.1 |
| 3,581,790 | 6/1971 | Conte | 241/169.1 |
| 3,642,045 | 2/1972 | Buvelot | 241/169.1 |
| 3,920,156 | 1/1975 | Hicks | 426/115 |
| 3,991,947 | 11/1976 | Schlessel | 241/169.1 |
| 4,023,912 | 5/1977 | Mahler et al. | 426/115 |
| 4,082,230 | 4/1978 | Bounds | 241/169.1 |
| 4,280,866 | 7/1981 | Jones | 241/273.2 |
| 4,311,283 | 1/1982 | Bounds | 241/273.2 |
| 4,815,671 | 3/1989 | Akira | 241/169.1 |

FOREIGN PATENT DOCUMENTS

| | | | |
|---|---|---|---|
| 78283 | 5/1894 | Fed. Rep. of Germany | 241/95 |
| 213512 | 9/1909 | Fed. Rep. of Germany | 241/95 |
| 428102 | 4/1926 | Fed. Rep. of Germany | 241/95 |
| 1025116 | 12/1955 | Fed. Rep. of Germany | 241/169.1 |
| 245378 | 6/1926 | Italy | 241/95 |
| 261093 | 11/1928 | Italy | 241/95 |
| 367532 | 6/1939 | Italy | 241/95 |
| 433798 | 4/1948 | Italy | |
| 448613 | 5/1949 | Italy | 241/95 |
| 14702 | 7/1897 | Switzerland | 241/95 |
| 32962 | 7/1905 | Switzerland | 241/169.1 |
| 178171 | 9/1935 | Switzerland | 241/95 |
| 365283 | 1/1932 | United Kingdom | 241/95 |

*Primary Examiner*—Steven Weinstein
*Attorney, Agent, or Firm*—Robert R. Keegan

[57] ABSTRACT

There is disclosed an integrated cheese package and grater of cylindrical form having a grating screen secured at the bottom of the cylindrical package and means freely rotatable within the package for engaging and turning a cylindrical block of cheese within the package to cause it to be grated with the granules passing through the grating screen. The package is provided with removable sealing strips on the top and/or bottom for enhanced shelf life. Top and bottom caps are provided for resealing the package after use to maintain freshness. One cheese rotating unit comprises a plastic disc having blades on the bottom surface and finger grippable projections on the top thereof. In a variation of the package, the cheese has a central axial hole and the top cap has a shaft extending downward which cooperates with a disc having spikes to engage the cheese block thereby forming a cheese rotating unit; when the top cap is closed the extending shaft resides in the central hollow of the cheese. In another version, the package includes three telescoping sections; a top hand grippable section has slots that rotatably engage vertical blades in the middle section also serving to engage with the cheese; hand rotation of the top section rotates the middle section which rotates the cheese.

6 Claims, 3 Drawing Sheets

CHEESE GRATER AND PACKAGE

The present invention relates to cheese graters and packages therefor, and more particularly to an integrated cheese grater and package of simple effective construction that makes it feasible to provide the consumer with a source of freshly grated cheese in a package which is compact and inexpensive to produce while at the same time incorporating a cheese grater with effectiveness and ease of use comparable to stand-alone cheese grating utensils. In its preferred embodiments the integrated package of cheese with grater is characterized by a hollow cylindrical body which may be formed of generally rigid plastic such as polyvinyl chloride, or polyethylene. Within the cylindrical body is a generally conforming cylinder of cheese having an outside dimension slightly less than the inside dimension of the package body so that it is freely rotatable. Closing the bottom opening in the cylindrical body is a generally conventional grating screen with which the cheese is in contact. The grating screen may either be integral with or secured with respect to the body and may be formed of plastic or of metal.

Preferably there are removable caps on the top and the bottom of the cylindrical body which are tapered tight fitting caps or otherwise arranged to form a nearly airtight seal to preserve the freshness of the cheese after the package has been opened and the cheese has first been grated and used.

The integrated package and grater is characterized by means for rotating the cheese with respect to the cylindrical body and the grater screen (which are not relatively rotatable).

Several variations of the invention are illustrated and several more are suggested. A preferred form, especially with respect to simplicity, has the cylindrical body and the grating screen previously mentioned and, for a cheese rotating unit, is provided with a hand grippable circular plate with upstanding finger grips thereon. The bottom surface of the plate has projections in the form of blades or spikes which penetrate and engage the cheese. Since the cylindrical body is large enough for the insertion of fingers of the hand to turn the cheese rotating unit, it is a simple matter to hold the body of the package with one hand and turn the cheese rotating unit with the fingers of the other to operate the cheese grater. Normally the body of the cheese grater will not be so large that it cannot be firmly gripped with one hand. This and other versions have top and bottom covers which are replaceable to preserve freshness of the ungrated cheese.

In the embodiment described above, it may be necessary for the fingers to be inserted somewhat into the cylindrical container as the cheese is grated and the remaining cheese body becomes smaller. In another version of the invention this is not necessary due to the provision of a handle with an extended shaft as a part of the cheese rotating unit. Although such a handle with extended shaft could be provided as an external element, one illustrated embodiment provides the handle and extended shaft as a top cover, and the extended shaft is received in a central opening in the cheese body before the package is opened or when it is not in use. The cheese body with a hollow core has another advantage in that it is unnecessary to provide any special arrangement to grate the center of the cheese which has very little movement when the cheese is rotated. In fact the grating screen may have a central opening only slightly smaller than the hollow core opening of the cheese to better release cheese granules from between the cheese and the grating screen.

In still another version the grater-package includes two or more telescoping cylindrical bodies so that the package is of extended height when full of cheese and reduces to a lesser height when the remaining cheese volume diminishes. In this version it is convenient for the cheese engaging projections to consist of blades on the interior of the innermost cylinder running parallel to the axis of the cylinder. In such case the periphery of the cheese is engaged rather than the top of the cheese as in other cases.

For many years it has been common to market certain cheeses such as parmesan cheese in grated form. While this is advantageous for convenience of the user, it has a serious disadvantage in that the grated cheese becomes stale much more rapidly than cheese in bulk form. Furthermore, the grated cheese occupies a substantially greater volume causing increased shipping costs and other disadvantages in marketing. The present invention provides not only a convenient source of grated cheese without the ensuing advantages of previously grated cheese, but also is advantageous as compared with use of bulk cheese and conventional cheese graters.

In a broad sense it may not be novel to provide a bulk product package with an integral comminuting device, but previous cheese grating structures have not lent themselves to adaptation to an integrated cheese grater and cheese package even if that were to be suggested. One common form of cheese grater includes a rotatable cylinder with a grating screen forming the periphery of the cylinder together with means for pressing a small portion of cheese against the grating cylinder while it is rotating. Grated cheese escapes from the interior of the grating cylinder. Such a grating device would not lend itself to incorporation in a cheese package or in any case would be much different than the apparatus of the present invention.

Some cheese graters exist which are superficially similar to the grater portion of the present integrated cheese grater and package as represented by U.S. Pat. No. 3,642,045 issued Feb. 15, 1972, to Buvelot (Cl. 146/60). Upon closer inspection however, the Buvelot device is substantially different from the grater devices incorporated in the present invention; it includes three telescoping cylinders with a circular grating screen rotatably mounted at the bottom of the middle cylinder. The interior of the middle cylinder is separated into two halves by a thin blade-like divider so that it is not possible for the cheese to rotate within the middle cylinder. On the contrary the outer cylinder is provided with lugs which engage indentations in the grater screen so that the grater screen may be rotated relative to the middle cylinder to which it is attached and relative to the cheese in respective compartments of the middle cylinder.

Downward pressure on the cheese is provided by an inside cylinder which also has slots to engage the divider in the middle cylinder; the inside cylinder is provided with a hand grip at the top so that the innermost and outermost cylinders can be rotated, one with respect to the other (the innermost cylinder also driving the middle cylinder).

Clearly the patent to Buvelot does not contemplate using the cylindrical grater arrangement as a package for cheese, nor would it be possible to do so without drastic revision. For example, it may be noted that if the Buvelot device were filled with a cylinder (or two half cylinders) of cheese, the center of the cheese would not be subjected to grating action because of the obstruction at the center of the screen where it is pivotally mounted to the middle cylinder. Further analysis of the Buvelot device would show additional impediments to employing it as a combined cheese package and grater apparatus.

It is contemplated that in many situations the cheese grater-package of the present invention will be sufficiently inexpensive so that there will be little incentive to refill it rather than to purchase another such package. However, there is no impediment to providing refill cheese bodies for the package which may be either the solid cylinder form or the hollow core cylinder form as appropriate.

In addition to providing the features and advantages described above it is an object of the present invention to provide a combined cheese grater and package wherein the package as sold to the consumer occupies only a slightly greater volume than the bulk cheese which it contains.

It is another object of the present invention to provide a combined cheese grater and package wherein the cheese grater is particularly convenient to use by twisting the opposite ends of the cylindrical package in opposite directions while pressing them together with moderate force.

It is another object of the present invention to provide a combination cheese grater and package wherein the cheese is rotatable within the cylindrical package with the bottom surface of the cheese in contact with a grating screen.

It is still another object of the present invention to provide an integrated cheese grater and package wherein the generally cylindrical body of cheese in the package has a hollow central core and the cheese rotating element of the grater has an elongated shaft which may be resident in the core opening of the cheese when the grater is not in use.

BRIEF DESCRIPTION OF THE DRAWINGS

Other objects and advantages of the invention will be apparent from consideration of the following description in conjunction with the appended drawings in which.

Figure 1:
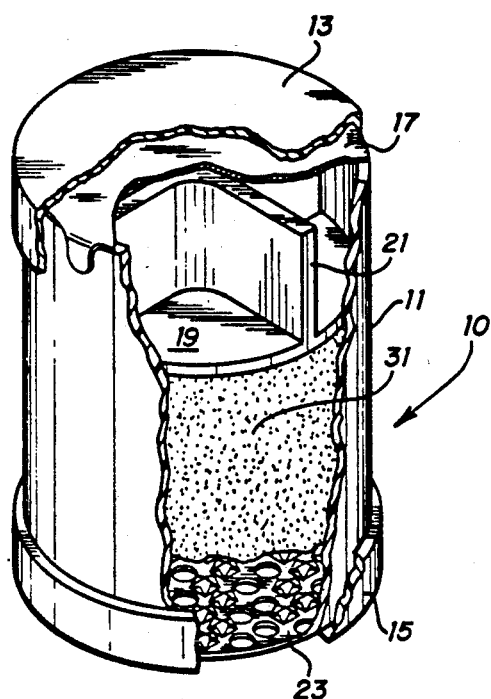
FIG. 1 is a perspective view partially broken away showing an integrated cheese grater and package according to the invention.

Referring now to the drawings, and particularly FIG. 1 through FIG. 4, an integrated cheese package and grater 10 is shown having a cylindrical body 11 molded or otherwise formed of polyvinyl chloride, polyethylene, ABS or any other suitable plastic.

A top cap 13 and a bottom cap 15 are provided for the container body 11. Preferably caps 13 and 15 are a close fitting tapered fit on cylindrical body 11 or otherwise arranged to provide a substantially air tight seal after the package has been opened and reclosed. If desired, a tear-away strip (not shown) may be provided on the original package overlying the edge of each cap 13 or 15 and removably adhered to the edge of the cap and the adjoining surface of the cylindrical body 11. Alternatively, the package 10 may be sealed in a heat-shrink package to maximize shelf life.

As an alternative to, or in conjunction with, the previous sealing means, a removable seal 17 closes the bottom of cylindrical body 11. Any of several well known forms of such seals employing thin sheet material such wax coated or plastic coated paper adhered on the bottom of the cylinder with a pressure sensitive adhesive may be employed. A removable seal may be provided on the top of cylindrical body 11 (not shown in FIG. 1).

Molded integrally in the bottom of cylinder 11 is a grating screen 23 having circular openings 25 therein for escape of grated cheese from within the cylinder. Further openings 27 are surrounded by grater teeth 29 serving to cut or scrape small particles of cheese as it is rotated against the grating screen 23. It is contemplated that the form and function of the grating screen 23 will be generally similar to the form and function of a stamped metal grating screen, although it is integrally molded with the cylindrical body 11. The most useful application of the invention is believed to be for hard cheese (e.g. parmesan) packaging and grating. The invention may be adapted to use with softer cheeses (e.g. cheddar) by selection of a conventional screen producing more of a shredding action. The device could also be used for other bulk products such as hard chocolate and "cheese" will be interpreted to include such products.

A cheese rotating unit 19 in the form of a molded plastic disc occupies the space above a cylindrical block of cheese 31 in grater-package 10. On the bottom of cheese grating unit 19 are radial blades 22 that may be pressed into the cheese block 31. A hand grippable element 21 is integrally molded with the cheese engaging unit 19, and is of cruciform shape so that it may be conveniently gripped with the thumb and forefinger of a user's hand 9 to rotate cheese rotating unit 19. At the same time the user will press down thereon forcing and maintaining blades 22 in engagement with the top of cheese block 31.

Such rotation of cheese block 31 results in the bottom surface of block 31 being grated by grating teeth 29 with the particles of cheese falling through openings 27 and 25. The screen 23 is configured to produce fine almost powdery particles of hard cheese by a scraping or rasping action of teeth 29. Other known forms of grating or shredding screens could be substituted for screen 23 if desired.

In the embodiment of FIGS. 1 through 4 it is preferred that the inside dimension of cylindrical body 11 be approximately 3 inches to 3½ inches as this will allow virtually all potential users of the grater to insert their fingers into the cylindrical body 11 to turn cheese rotating element 19 even when the block of cheese has been nearly depleted with cheese rotating element 19 residing near the bottom of cylindrical body 11. Hand grippable element 21 and cap 13 may be taller so little or no hand insertion in cylindrical body is required.

Figure 2:
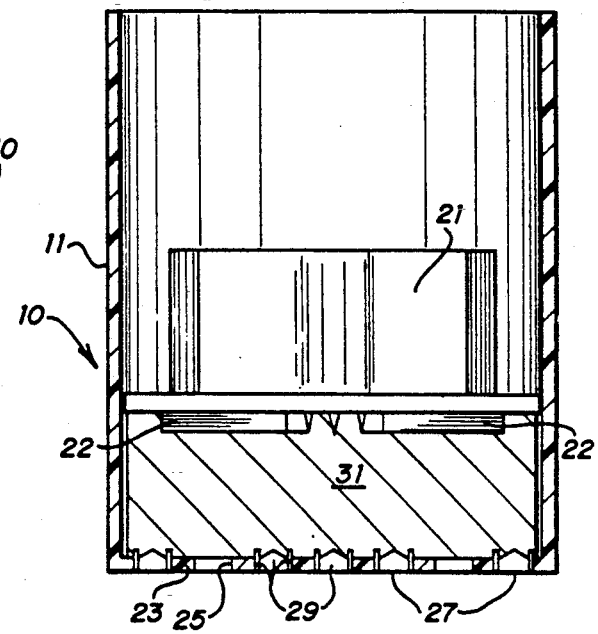
FIG. 2 is a vertical sectional view of the apparatus of FIG. 1 as it would appear after part of the cheese had been expended.
Figure 3:
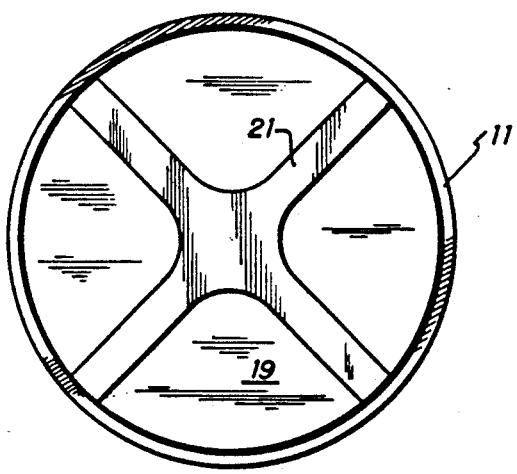
FIG. 3 is a top plan view of the apparatus of FIG. 1 with the cover and seal removed.
Figure 4:
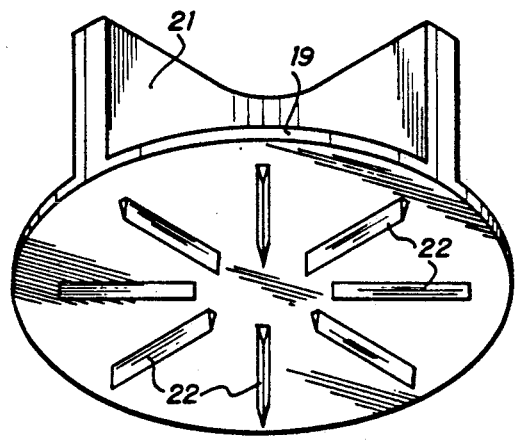
FIG. 4 is a perspective view showing the cheese rotating unit of FIGS. 1, 2, and 3.

It will be noted that FIG. 1 illustrates the package, grater, and cheese before the package is opened or the cheese expended, while FIG. 2 shows the grater-package in use after more than half of the cheese has been expended.

Figure 5:
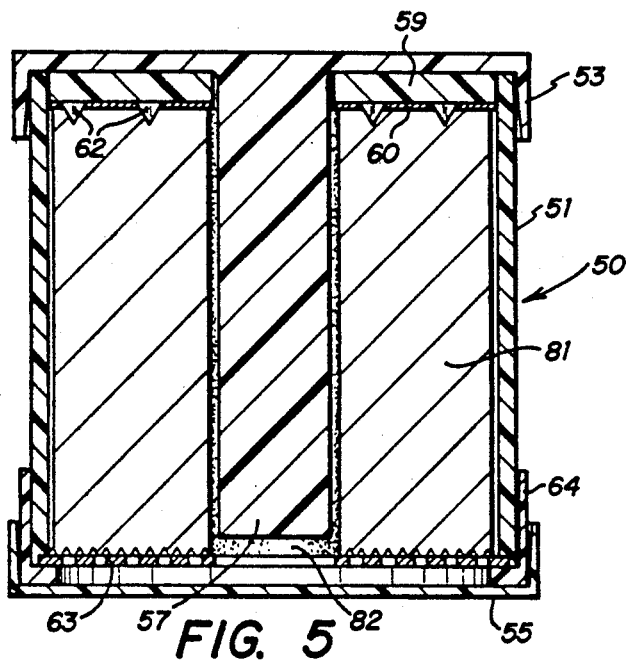
FIG. 5 is a vertical sectional view of an alternative form of integrated cheese grater and package according to the invention.
Figure 7:
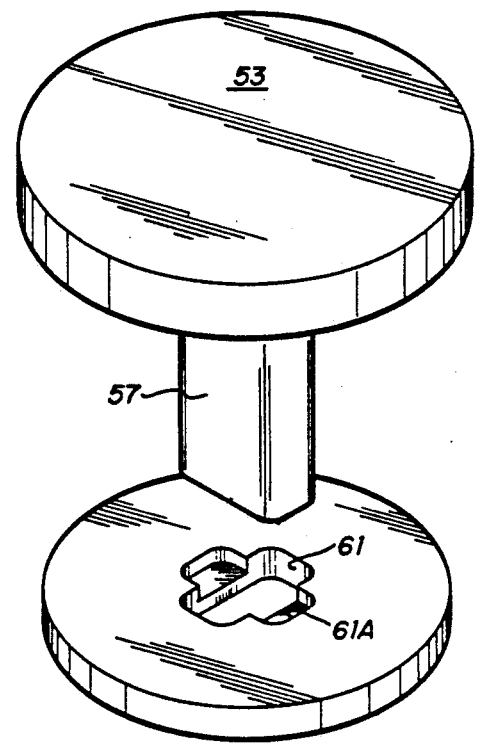
FIG. 7 is an exploded perspective view of the cheese rotating unit of the apparatus of FIGS. 5 and 6.
Figure 6:
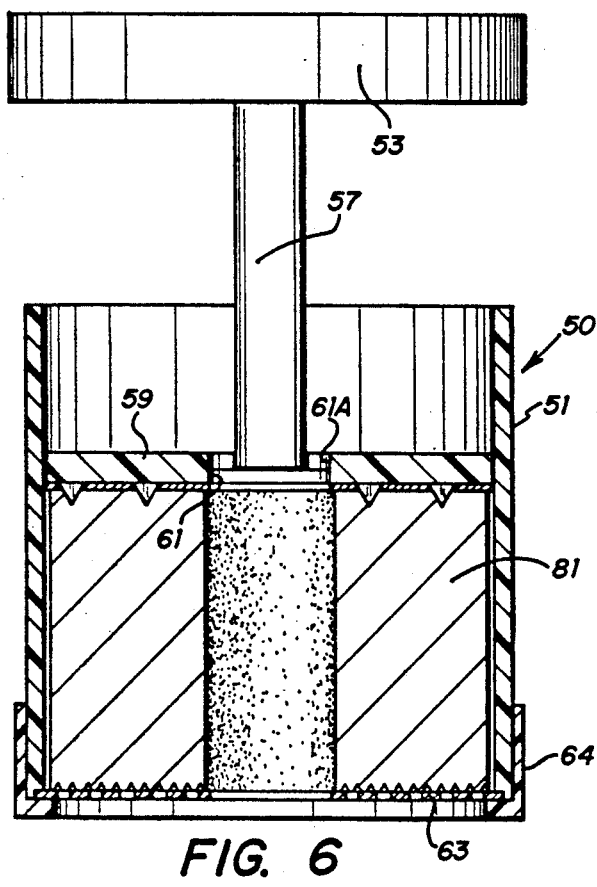
FIG. 6 is a vertical sectional view of the apparatus of FIG. 5 taken at right angles and with the cheese rotating handle portion thereof raised to an operative position.

While the apparatus of FIGS. 1 through 4 is a preferred embodiment for some purposes, the slightly more complicated alternative embodiment of FIGS. 5, 6, and 7 has certain useful features and advantages.

The integrated cheese grater and package 50 of FIG. 5 has as its main component a hollow plastic cylinder 51 generally similar to cylinder 11 in FIG. 1. A top closure 53 has integrally formed therewith a downwardly projecting extension 57 which, as will later be described, permits top closure 53 to be utilized as a handle. It will be noted that cheese block 81 of FIGS. 5–7 has a central axial opening 82 so that extension 57 of closure 53 resides in the opening 82 of cheese block 81 before the package 50 is opened. The least inside transverse dimension of the cylinder is greater than two and three-quarter inches and the cheese block has an opening of at least about one-half inch diameter extending axially therethrough.

A cheese rotating unit 59 resides on top of the cylindrical cheese block 81 and may be formed of the same polyvinyl chloride, polyethylene, ABS, or other plastic utilized in forming the package.

Secured to the bottom of cheese rotating unit 59 is a thin metal disc of aluminum, stainless steel, or the like, having generally triangular teeth 62 stamped out of the metal and adapted to penetrate the top surface of cylindrical cheese block 81. Thus cheese rotating unit 59 when pressed down on cheese block 81 engages therewith and cheese block 81 is caused to rotate with the rotation of cheese rotating unit 59.

A grating screen 63 extends across the bottom of cylinder 51 and is also formed from a thin metallic sheet by stamping in a generally conventional manner. Grating screen 63 is secured in place by an annular collar 64 and may additionally be secured by adhesive to cylinder 51. Preferably lugs or indentations (not referenced) are provided on the periphery of screen 63 to positively prevent rotation of screen 63 relative to cylindrical body 51.

It will be observed that screen 63 has an opening in the central portion thereof which may optionally be provided to further facilitate escape of cheese granules from above the screen 63. It will also be noted that the central opening in cheese block 81 eliminates any problem with lack of relative movement of the cheese with respect to the grating screen near the center of rotation of the cheese block.

As best seen in FIG. 7, the grating process is carried out with the grater-package 50 by removing bottom cap 55 and raising top cap 53 and rotating it by 90 degrees as shown in FIG. 6. The end of extension 57 is thereby withdrawn from the through-opening 61 and caused to rest in the rectangular indentation 61A. The person operating the cheese grater can then rotate top closure 53 while pressing down thereon causing cheese block 81 to be grated by the action of grating screen 63. Preferably the grating screen 63 and other grating screens of other embodiments are neither right-handed nor left-handed; that is, grating action may be achieved by either clockwise or counter-clockwise rotation of handle 53. Accordingly, rapid grating of the cheese may be accomplished by back and forth rotation of top closure and handle 53.

After the desired quantity of cheese has been grated, closure 53 may be restored with extension 57 again extending through opening 61 and into the opening 82 in cheese block 81. Bottom cap 55 may also be replaced, thus sealing the package in nearly air-tight fashion for preservation of the freshness of the cheese.

As will be seen in FIG. 6 the extension 57 is of sufficient length so that it will engage with cheese rotating unit 59 until the point where the cheese block 81 is virtually entirely expended, and cheese rotating unit 59 is nearly at the bottom limit represented by grating screen 63.

Figure 8:
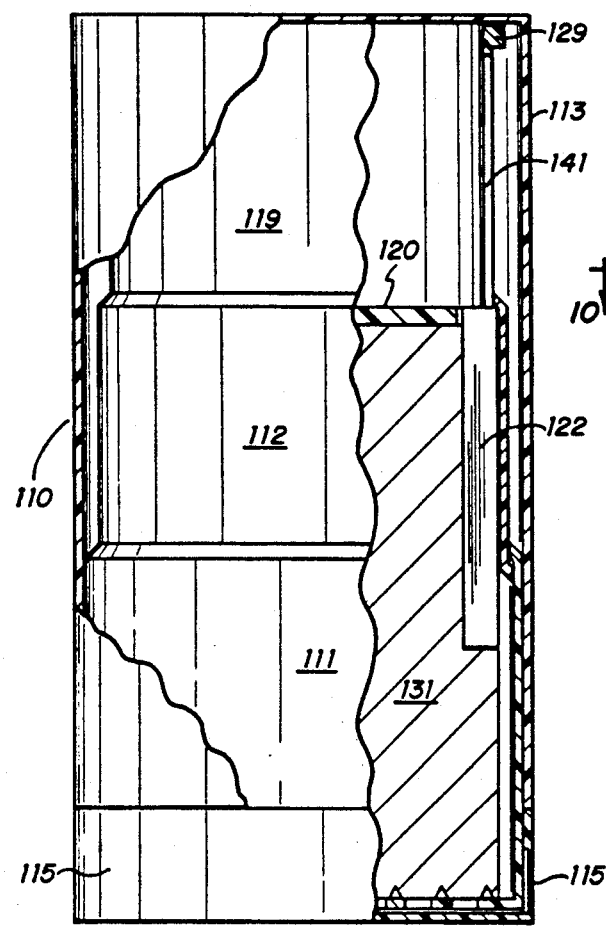
FIG. 8 is a side elevational view partially broken away of a further alternative form of integrated cheese grater and package according to the invention.
Figure 9:
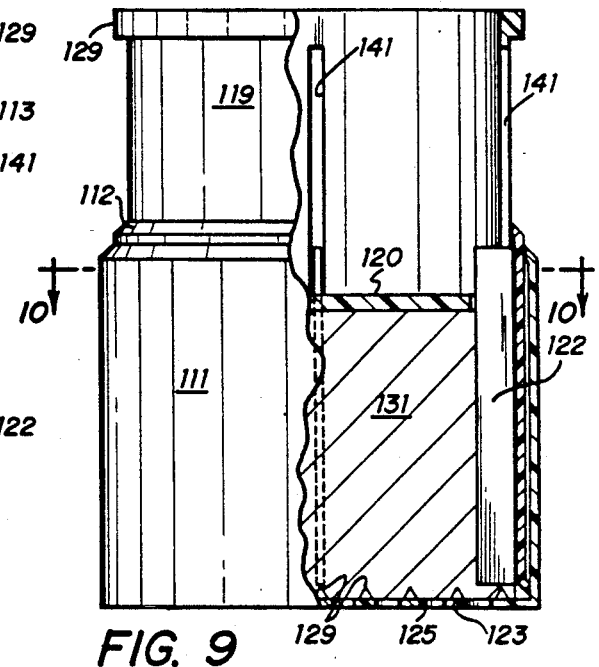
FIG. 9 is a view similar to FIG. 8 showing the package configuration after a portion of the cheese had been expended.

Another alternative embodiment of the invention is shown in FIG. 8 through FIG. 11 which is characterized by a package with a telescoping structure. As shown in FIGS. 8 and 9 particularly, an integrated cheese grater and package 110 comprises a plurality of telescoping cylinders, 111, 112, and 119.

The package 110 is provided with a bottom cap 115 and a tall top closure 113, both of which have inside dimensions matching the outside dimension of cylinder 111 so that when the package is closed as shown in FIG. 8 there is a near air-tight seal for the contents. As purchased by the consumer, the package 110 may be provided with a strippable sealing strip covering the junction between bottom cap 115 and top closure 113 to provide a tighter seal and also a tamper resistant package. Such arrangements are conventional and are not illustrated in FIG. 8.

Figure 10:
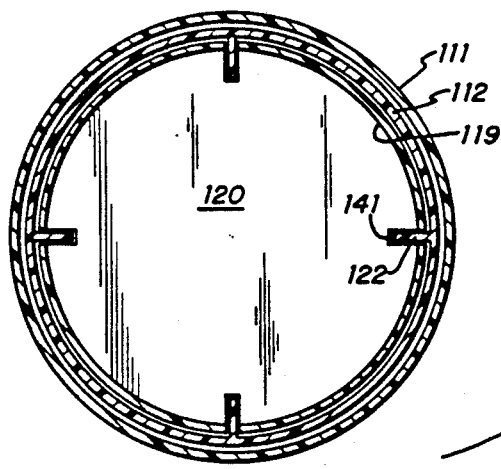
FIG. 10 is a horizontal sectional view showing the structure of the cheese engaging unit of FIGS. 8 and 9.
Figure 11:
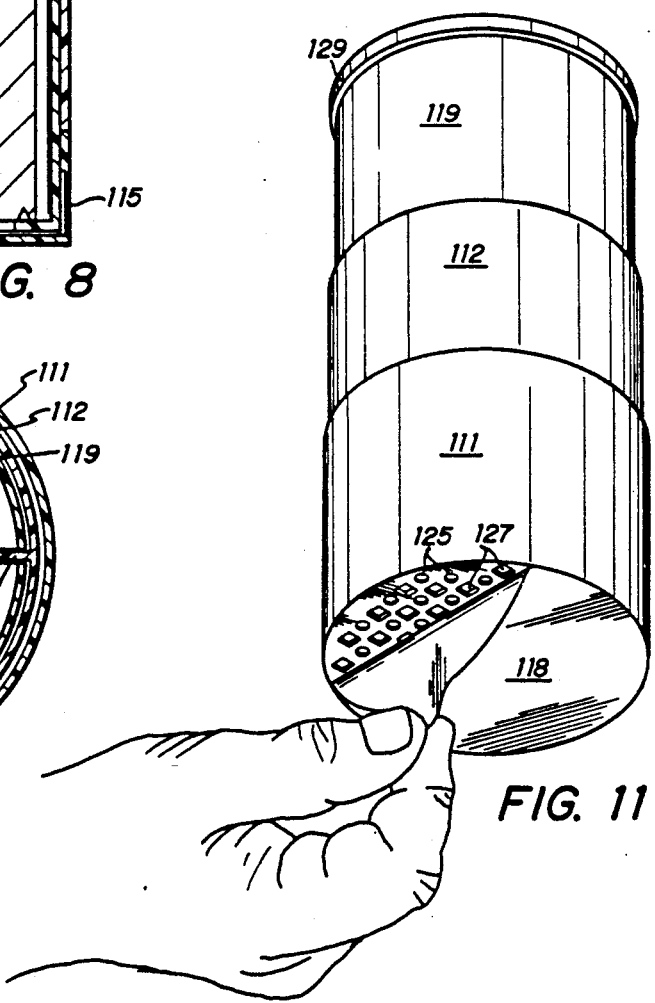
FIG. 11 is a perspective view of the apparatus of FIGS. 8 and 9 showing the removable bottom seal therefor.

In the embodiment of FIGS. 8 through 10, the middle cylinder 112 serves as a cheese rotating unit, together with the small cylinder 119 which is a hand grippable element for rotating the cheese rotating unit. The bottom end of cylinder 119 is closed by a bottom portion 120 so that downward force on the hand grippable cylinder 119 is conveyed to a cheese block 131. Although the cheese block 131 is shown solid as was the cheese block of FIGS. 1 through 4, the cheese block 131 could have a central opening as previously described with respect to FIGS. 5 through 7. For that matter, the embodiment of FIGS. 1 through 4 could also have a cheese block with a hollow center, if desired.

Middle cylinder 112 has cheese engaging blades 122 which may be spaced apart by 90 degrees as shown and which cause the cheese block 131 to be engaged for rotational movement with middle cylinder 112.

Slots 141 and small cylinder 119 are positioned coincident with the vanes 122 so that cylinder 119 can move down vertically relative to cylinder 112 while rotational motion between cylinder 119 and 112 is prevented by the engagement of slots 141 and vanes 122. FIG. 9 shows the operation of the integrated cheese package and grater of FIGS. 8 through 11 as the cheese block is expended. As indicated, the cylinder 112 telescopes into cylinder 111 as the bottom surface of the cheese block 131 is grated away. Also, the cylinder 119 will telescope within cylinder 112 causing the cheese to slide down relative to vanes 122 until essentially all of the cheese block is consumed.

Extending transversely across the bottom of cylinder 111 is a grating screen 123 similar to screen 23 of FIG. 1. Grating screen 123 is provided with through openings 125 for the passage of cheese granules and with toothed openings 129 for scraping and grating the bottom surface of the cheese block 131. Preferably the grating screen 123 is integrally molded with cylinder 111 although it may be a separate stamped metal grating screen of the sort described and illustrated with respect to FIGS. 5-7.

A plastic coated paper seal 118 is adhered to the bottom of cylinder 111 and grating screen 123 to improve the shelf life and product freshness for the cheese. Although not shown, a similar removable seal would normally be provided for the top of the cylinder 119. Such seals may be employed at the top or the bottom or both of any or all of the embodiments of the invention shown and described.

The telescoping structure of this embodiment makes the hand grip 129 at the upper portion of cylinder 119 accessible as the cheese block is depleted, avoiding the necessity for the person using the grater to insert fingers in the top of the grater-package as in the embodiment of FIGS. 1-4. Accordingly the desired diameter for the package of FIGS. 8 through 11 can be selected without regard to allowing sufficient room for the insertion of the operating person's hand into the top of the container. Although one could provide more than three telescoping sections for the package of FIGS. 8-11, the arrangement of three cylinder sections as illustrated is preferred.

It will be apparent to those skilled in the art that various features of any of the three embodiments of the integrated cheese grater package can be incorporated into or omitted from others of the embodiments without exceeding the scope of the invention. While plastics and metals have been suggested for various elements of the various configurations it will be understood that the materials employed are generally not critical and numerous known plastics and other materials may be employed in accordance with usual design and engineering practice.

In addition to the various modifications and variations to the invention which have been shown or suggested, it will be apparent to those skilled in the art that numerous other modifications or variations may be made within the scope of the invention, and accordingly the scope of the invention is not to be considered limited to those embodiments shown or suggested, but is rather to be determined by reference to the appended claims.

What is claimed is:

1. An integrated cheese package and grater comprising:

a hollow generally cylindrical container, a grating screen extending transversely in the lower end of said container and having openings in the screen for the escape of grated cheese from the container, a generally cylindrical block of cheese in said container in contact with said screen, said block of cheese having an opening of at least about one-half inch diameter extending axially therethrough, a cheese rotating unit residing on top of said cheese block and having at least one cheese penetrating element sufficient such that when said cheese rotating unit is pressed down on said cheese block, the unit engages said cheese block and said cheese block is caused to rotate with rotation of said unit, a hand grippable device by which said unit may be rotatably engaged and hand rotated, said hand grippable device comprising a hand grippable, transversely extending top closure for said container and an extension projecting downwardly and normally from said top closure, said extension being dimensioned to be axially slidable into said opening of said block of cheese when said top closure is positioned on said container in its closed position, said rotating unit having a through opening of sufficient size and cross-section to allow said extension to slide through said rotating unit and said block of cheese when said top closure is in said closed position on said container, said rotating unit also having a recessed, non-through, indentation oriented at a angle from said through-opening and having a size and cross-section such that when ready for grating, the top cover is removable from said container, thus raising the downwardly projecting extension out of the block of cheese and the rotating unit, and then, upon rotating the top closure and thus the extension, so that the extension is lined up with the indentation, the bottom of the extension is then positioned into the rotating unit to rest securely in the indentation such that upon gripping and rotation of the top cover and the application of pressure, the extension will rotate the block of cheese and grate the cheese against the grating screen, said cheese package further comprising a closure to cover the lower end of said container and said grating screen.

2. Apparatus as recited in claim 1 wherein the least inside transverse dimension of said container is greater than two and threequarter inches.

3. Apparatus as recited in claim 1 wherein said generally cylindrical container has the shape of a right circular cylinder.

4. Apparatus as recited in claim 3 wherein said block of cheese has the shape of a right circular cylinder and has a greatest outside transverse dimension less than the least inside transverse dimension of said container.

5. Apparatus as recited in claim 1 further including removable seals of thin sheet material adhered on the lower end and the upper end of said container underneath the respective closures therefor.

6. Apparatus as recited in claim 1 wherein said grating screen comprises a generally circular sheet of thin relatively rigid metal wherein said openings are punched-out openings with adjacent upward projections formed from the material displaced from the openings.

* * * * *